(12) United States Patent
Koskimies et al.

(10) Patent No.: US 7,483,925 B2
(45) Date of Patent: Jan. 27, 2009

(54) SELECTING DATA FOR SYNCHRONIZATION

(75) Inventors: Oskari Koskimies, Helsinki (FI); Janne Juhola, Lempaala (FI)

(73) Assignee: Nokia Corporation, Espoo (FI)

( * ) Notice: Subject to any disclaimer, the term of this patent is extended or adjusted under 35 U.S.C. 154(b) by 552 days.

(21) Appl. No.: 11/124,658

(22) Filed: May 9, 2005

(65) Prior Publication Data

US 2005/0203971 A1      Sep. 15, 2005

Related U.S. Application Data

(63) Continuation-in-part of application No. 10/170,329, filed on Jun. 12, 2002, now abandoned.

(30) Foreign Application Priority Data

Jun. 15, 2001     (FI)    .................... 20011277

(51) Int. Cl.
G06F 7/00       (2006.01)
G06F 17/30      (2006.01)
G06F 12/00      (2006.01)
G06F 15/16      (2006.01)
G06F 15/167     (2006.01)

(52) U.S. Cl. ............... 707/203; 707/2; 707/7; 707/10; 707/200; 707/201; 707/202; 707/204; 709/203; 709/213; 709/217; 709/248

(58) Field of Classification Search ........ 707/201, 707/204, 2, 7, 10, 200, 202, 203; 709/203, 709/213, 217, 248
See application file for complete search history.

(56) References Cited

U.S. PATENT DOCUMENTS

| | | | |
|---|---|---|---|
| 5,706,509 A | 1/1998 | Man-Hak Tso | ............. 395/617 |
| 5,758,337 A | 5/1998 | Hammond | ..................... 707/6 |
| 5,758,355 A * | 5/1998 | Buchanan | ................... 707/201 |
| 5,826,261 A | 10/1998 | Spencer | ......................... 705/5 |
| 5,884,325 A | 3/1999 | Bauer et al. | ................. 707/201 |
| 5,926,816 A | 7/1999 | Bauer et al. | .................... 707/8 |
| 6,012,063 A | 1/2000 | Bodnar | ....................... 707/101 |
| 6,052,735 A | 4/2000 | Ulrich et al. | ................ 709/236 |
| 6,212,529 B1 | 4/2001 | Boothby et al. | ............ 707/201 |
| 6,549,896 B1 * | 4/2003 | Candan et al. | ................ 707/2 |
| 6,904,454 B2 * | 6/2005 | Stickler | ...................... 709/213 |
| 7,139,757 B1 * | 11/2006 | Apollonsky et al. | ........... 707/7 |
| 2002/0078075 A1 * | 6/2002 | Colson et al. | ............... 707/204 |
| 2002/0143782 A1 | 10/2002 | Headings et al. | ............ 707/100 |

FOREIGN PATENT DOCUMENTS

| | | |
|---|---|---|
| WO | WO 00/54525 | 9/2000 |
| WO | WO 02/077860 A1 | 10/2002 |
| WO | WO 02/086758 A1 | 10/2002 |
| WO | WO 02/093427 A1 | 11/2002 |

* cited by examiner

*Primary Examiner*—Wilson Lee
*Assistant Examiner*—Cheryl M Shechtman
(74) *Attorney, Agent, or Firm*—Perman & Green, LLP (57) ABSTRACT

A method for selecting a data set to be synchronized from databases of a data system, in which system metadata illustrating the relationships between data units of the data system are stored for the selection of the data set to be synchronized. The metadata comprises at least information on the relevance between the data units. When a first data set is to be synchronized, metadata associated with at least one initial data unit of the first data set is retrieved. Next, a second data set, which according to at least one metadata element comprises a data unit of maximum relevance to the initial data unit, is selected for synchronization.

22 Claims, 5 Drawing Sheets

SELECTING DATA FOR SYNCHRONIZATION

This application is a continuation-in-part application of and claims the benefit of and priority from U.S. patent application Ser. No. 10/170,329, filed Jun. 12, 2002, now abandoned. This application is also related to U.S. application Ser. No. 10/309,570, filed on Dec. 4, 2002, now U.S. Pat. No. 7,320,011.

BACKGROUND OF THE INVENTION

The invention relates to selecting data for synchronization. Data synchronization is an operation in which a correspondence is provided between the data collections of at least two databases to the effect that, after the synchronization, the data units of the data collections substantially correspond to each other. The term 'database' should be understood in its broad sense to relate to any data collection which resides in a data source or data storage and which can be updated using one or more applications.

Along with the increasing popularity of new networking terminals, such as portable computers, PDA (Personal Digital Assistant) devices, mobile stations and pagers, the need for data synchronization has increased as well. Data of calendar and electronic mail applications in particular are typical examples of data that need to be synchronized. Synchronization has conventionally been based on different proprietary protocols, which are not compatible with each other. However, in mobile communications in particular, it is important that data can be obtained and updated irrespective of the terminal and application in use.

For improved synchronization of application data, a Synchronization Mark-up Language (SyncML) based on the Extensible Mark-up Language (XML) has been developed. A SyncML synchronization protocol employing messages of SyncML format allows the data of any application to be synchronized between any networked terminals. The SyncML synchronization protocol functions both in wireless and in fixed networks and supports a plural number of transmission protocols. SyncML provides both a synchronization protocol and a data representation protocol.

The implementation of data synchronization is described in the SyncML standard, but the standard does not specify in detail how to select the data that is to be synchronized. Typically, the amount of data on a server or desktop computer considerably exceeds the capacity of a portable device. Even larger portable terminals, such as portable computers, are not necessarily able to store all the data needed by the user, for example copies of every important document contained in a company's data system. If synchronization is carried out over the radio interface, further restrictions are caused by the available bandwidth. From the user's point of view, synchronization over the radio interface may appear to be too slow, and in a mobile communications network the transmission costs may be too high. Consequently, it is necessary to restrict the amount of data to be synchronized by selecting only a subset of the data for synchronization. This may be called 'adaptive synchronization'. However, it is not easy to select the subset. For example, when electronic mail messages are to be synchronized, subsets such as 'New Items', 'Outgoing Items' and 'Deleted Items' could be useful. However, among the New Items, there may be a message that refers to a previous one on the same subject, in which case an important message might be inaccessible to the user. The selecting of the data to be synchronized thus depends on various factors, such as the application concerned, the terminal and the needs of the user.

In the prior art, adaptive synchronization is restricted to certain application-specific techniques that simply allow specific data units to be excluded from the data to be synchronized. A typical example is to rule out electronic mail attachment files. U.S. Pat. No. 6,052,735 discloses a method in which only some of the attachment files of electronic mail messages are synchronized between a computer and a wireless terminal. The synchronization may be based on the user's choice or on filtering, in which case only pre-determined attachment files will be synchronized. In that case only electronic mail messages transferred according to a specific transfer technique can be synchronized. However, U.S. Pat. No. 6,052,735 does not provide a solution for efficient selection of the data to be synchronized. In addition, prior art solutions do not take into account the different needs of applications. The SyncML protocol provides a kind of an adaption possibility in which the server is aware of the restrictions of the terminal. This means that the terminal application does not need to support all fields of a data unit and the amount of data can thus be reduced. Nevertheless, all data units are still fetched to the terminal in this case, too.

BRIEF DESCRIPTION OF THE INVENTION

It is therefore an object of the invention to provide an improved method and equipment implementing the method to allow data to be selected for synchronization such that the most important data units are selected. The objectives of the invention are achieved with a method, synchronization system, synchronization device and computer software product characterized by what is stated in the independent claims. Preferred embodiments of the invention are disclosed in the dependent claims.

The invention is based on maintaining in the data system metadata on the relationships between the data units for the purpose of selecting the data to be synchronized. The metadata comprises at least information about relevance relationships between the data units. Relevance is preferably given as a numerical value to express the probability of the user needing a data unit associated with an initial data unit, either directly or through other data units, provided that the initial data unit has been selected. In the system, metadata relating to at least one initial data unit of a first data set is retrieved when the first data set is to be synchronized. On the basis of the metadata, a second data set, comprising at least one data unit that is most relevant to the initial data unit, is selected for synchronization. Typically, in addition to the first data set, data units outside the first data set that are most relevant to the initial data units are selected into the second data set. On the other hand, it is also possible that only most relevant initial data units from the first data set are selected into the second data set on the basis of the metadata.

The solution of the invention provides an advantage in that it allows different relationships between the data units to be taken into account for selecting the second data set to be synchronized. This allows the most relevant data units to be selected for synchronization, and thereby the restricted terminal resources and the limited bandwidth available in wireless data transmission are more efficiently utilized. Since relevant data units can be automatically selected for synchronization, the user does not need to separately define or restrict the data units to be synchronized, which provides improved usability. Since the method can be used in different applications, the relationships between the applications can be taken into account.

According to a preferred embodiment of the invention, situation-specific metadata are defined into the data system for different synchronization situations. On the basis of the synchronization situation concerned, metadata representing the relationships between the data units is selected. The synchronization situation may be defined for example in the form of profile alternatives available to the user, such as a business trip profile or a holiday trip profile. The advantage of this embodiment is that it further improves the possibilities to take the user's needs into account when data is selected for synchronization.

BRIEF DESCRIPTION OF THE DRAWINGS

In the following, the invention will be described in connection with the preferred embodiments and with reference to the accompanying drawings, in which.

DETAILED DESCRIPTION OF THE INVENTION

Figure 1:
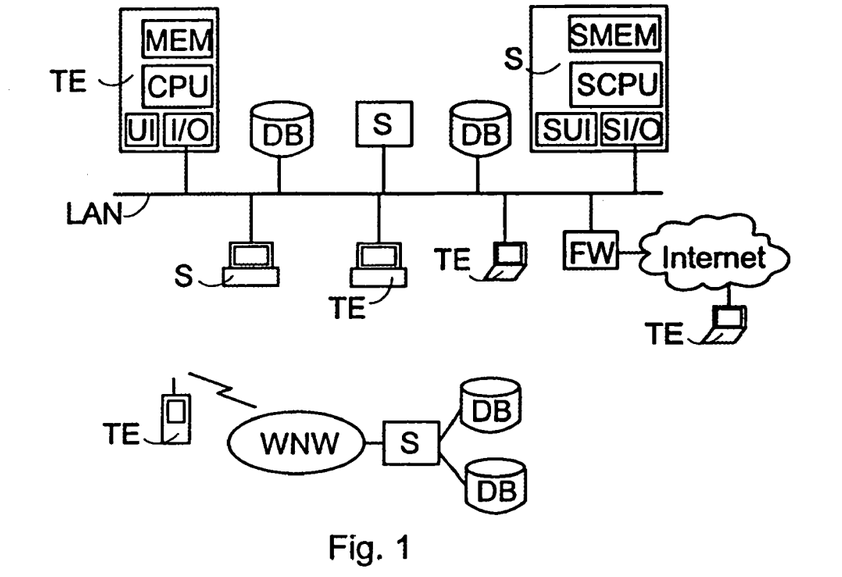
FIG. 1 is a general view of a data system in which the data of the databases can be synchronized.

FIG. 1 illustrates a networked data system, in which data comprised in separate databases DB and terminals TE can be synchronized. From the point of view of synchronization, the terminal TE is a Client Device, and it is typically a portable computer, PDA device, mobile station or pager, and a synchronization server S is a server, typically serving a plurality of client devices. However, the synchronization server is not restricted to any particular equipment type; unlike in the example described, a wireless terminal can also function as a synchronization server. FIG. 1 shows two examples, the first one of which comprises terminals TE, databases DB and synchronization servers S connected to a Local Area Network LAN. A terminal TE connected to the network LAN comprises a functionality, such as a network card and software controlling data transmission, for communicating with the devices in the network LAN. The local area network LAN may be a local area network of any type, and the TE may communicate with the server S also over the Internet, typically through a firewall FW.

In the second example, the terminal TE, synchronization server S and databases DB are connected to a wireless network WNW. The terminal TE connected to the network WNW comprises a mobile communications functionality for wireless communication with the network WNW. The wireless network WNW may be any already known wireless network, such as a network supporting a GSM service, a network supporting a GPRS service (General Packet Radio Service), a third generation mobile communications network, such as a UMTS network (Universal Mobile Telecommunications System), a wireless local area network WLAN, or a private network. It is to be noted that the server S may also comprise a database DB, although in FIG. 1 the servers S and the databases DB are separate, for the sake of clarity.

Figure 4:
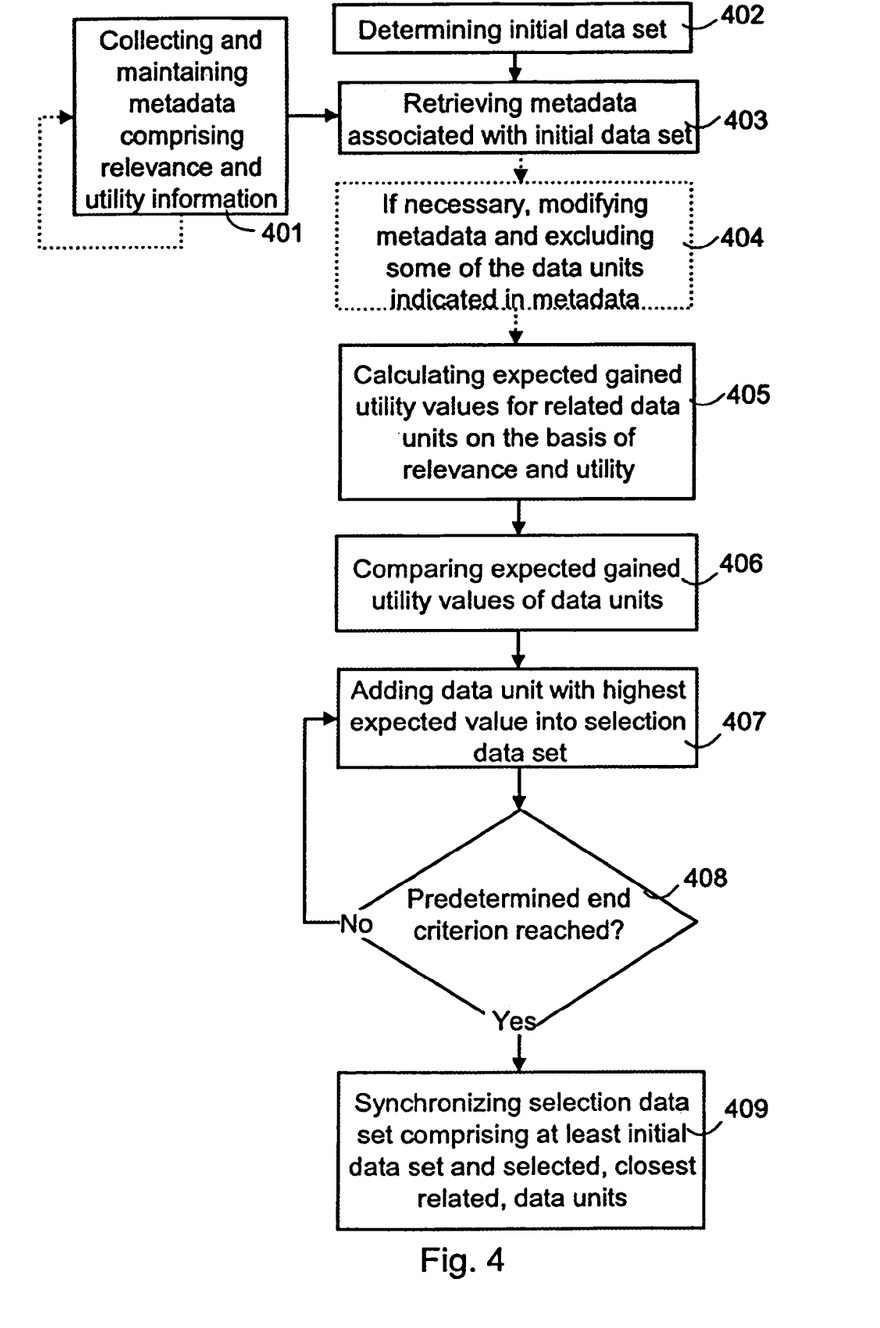
FIG. 4 is a flow diagram illustrating a method according to a preferred embodiment of the invention.
Figure 5:
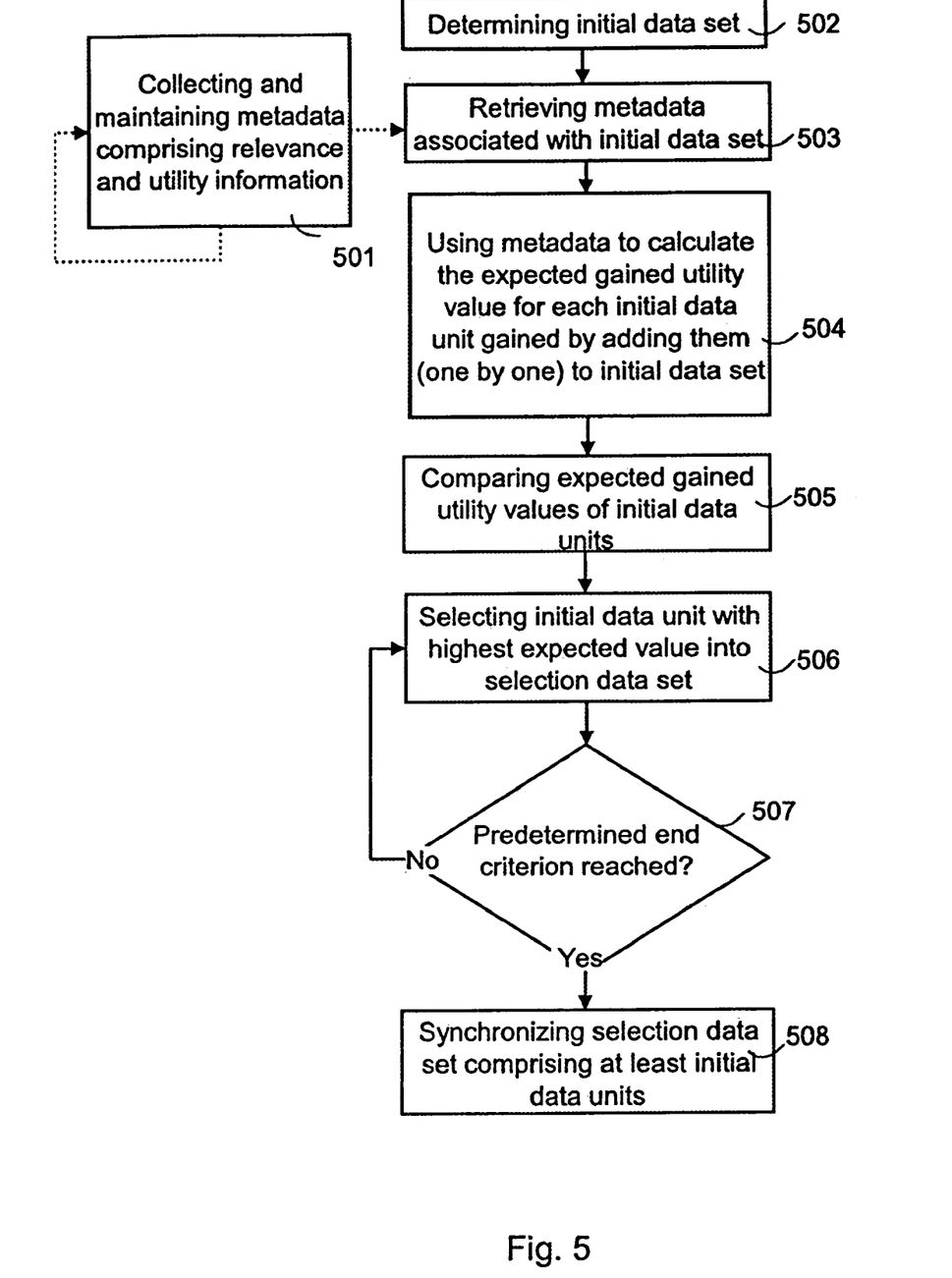
FIG. 5 is a flow diagram illustrating a method according to a second preferred embodiment of the invention.

The terminals TE (in wired networks LAN and wireless networks WNW) and the servers S comprise memory MEM; SMEM, a user interface UI; SUI, I/O means I/O; SI/O for arranging data transmission, and a Central Processing Unit CPU; SCPU comprising one or more processors. Application data that is to be synchronized may be stored in the TE memory MEM (which, from the point of view of synchronization, may be a database to be synchronized), the database DB memory, as well as the server S memory SMEM. In response to a computer program code stored in the memory MEM; SMEM and executed in the central processing units CPU and SCPU, the terminal TE and the synchronization server S execute the inventive means, some embodiments of which are shown in FIGS. 4 and 5. The computer programs may be obtained through the network and/or they may be stored in memory means, such as a disc, CD-ROM disc or other external memory means from which they can be loaded into the memory MEM; SMEM. Hardware solutions can also be used.

Figure 2:
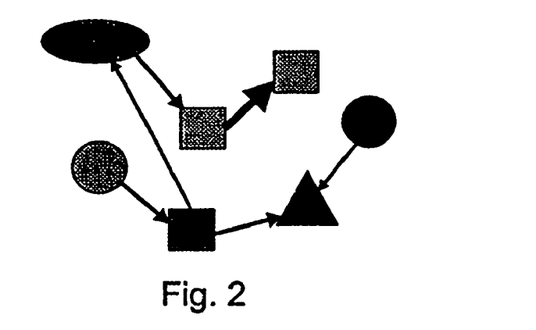
FIG. 2 is a metadata graph.

Metadata on the relationships between the data units are maintained in the data system. FIG. 2 shows an example of a metadata graph. The nodes in the graph represent the data units and the links depicted by arrows illustrate the relationships between the data units. Each link is assigned at least one value expressing how closely the target node is associated with the source node (the closeness of the relationship). The metadata graph is preferably a directional network. As shown in FIG. 2, relationships between different types of data units (depicted in different shapes) are also preferably determined. A thicker link is used in FIG. 2 to denote a close relationship between the data units, whereas a thinner link is used for a remote relationship. A simple metadata graph could comprise for example an electronic mail data unit linked at least with earlier electronic mail messages on the same subject, with the contact information of the sender or the recipients, and with attachment files, if any, attached to the data unit.

Figure 3:
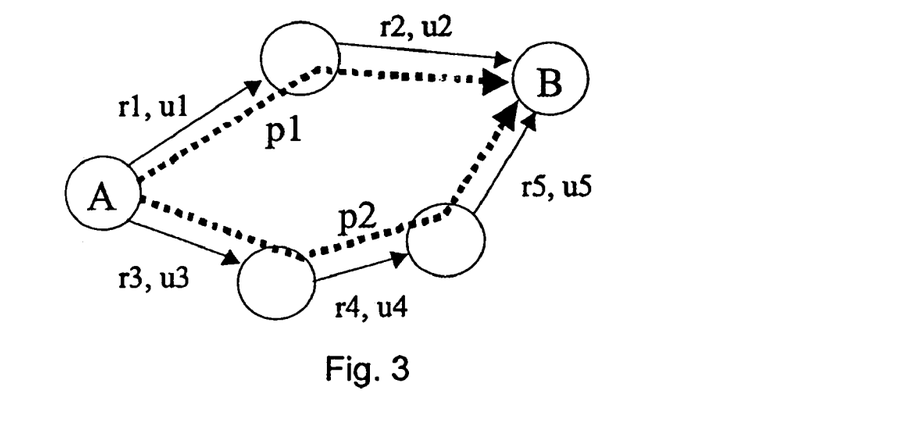
FIG. 3 shows a path illustrating the relationship between data units.

Synchronization requires the determining of an initial data set the data units of which are at least to be synchronized. The metadata links allow paths from the initial data set to different data units to be determined. FIG. 3 illustrates paths from initial data unit A to data unit B according to a preferred embodiment of the invention. In a preferred embodiment, the relationship between the data units is denoted by relevance and utility. Relevance is a value representing the probability that the user will need a data unit associated with an initial data unit, either directly or through other data units, provided that the initial data unit has been selected. In FIG. 3, relevance is denoted by ri. Utility expresses the utility of a data unit associated with an initial data unit in the metadata, either directly or over a link through other data units, provided that the initial data unit has been selected. Utility can be thought of as added value obtained by a related data unit, or, on the other hand, as a loss, if the data unit is not available even if it were needed. In FIG. 3 utility is shown by ui, each link between A and B being provided with a relevance value ri and a utility value ui. The initial data unit A and the related data unit B may be connected by several paths. The different paths represent different reasons why a user who needs the initial data unit A might also need the data unit B. In FIG. 3, there are two paths p1 and p2 between A and B, the paths having the following probabilities:

$$p1=P(p1)=r1*r2$$

$$p2=P(p2)=r3*r4*r5.$$

Hence, the relevance of B to A is the product of the relevance values assigned to the data units along the path. B's utility to A is determined by the utility value of the last link, i.e. utility through path p1 is u2 and through path p2 it is u5. Gained Utility g is the utility of the data units that the user would really request. Since the user's actions cannot be known in advance, gained utility is a random variable and therefore has a distribution and expected value. The closeness of the relationship between the data units A and B, i.e. the importance of data unit B in the selection of data unit A, can be defined by calculating an Expected Gained Utility E(g) value. If the user needs the data unit B for several different reasons (a plurality of paths p1, p2), the gained utility obtained with the data unit B can be determined in the form of the maximum utility of the paths (max(u2,u5). It is also possible to use the utility of an individual path or the combined utilities of different paths as the utility to be gained by data unit selection. The expected gained utility E(g) is preferably calculated by taking into account both paths p1, p2, whereby the following is obtained:

$$E(g)=u2*P(p1)*(1-P(p2))+u5*P(p2)*(1-P(p1))+\max(u2,u5)*P(p1)*P(p2).$$

If the utility value ui of the links is set at one, the expected gained utility E(g) represents the probability of a data unit being needed for some reason. Hence, in the example of FIG. 3, E(g) is $$P(p1)*(1-P(p2))+P(p2)*(1-P(p1))+P(p1)*P(p2)=$$

$$P(p1)-P(p1)*P(p2)+P(p2)-P(p2)*P(p1)+P(p1)*P(p2)=$$

$$P(p1)+P(p2)-P(p1)*P(p2)=$$

$$P(p1\cup p2).$$

A comparison of the expected gained utility E(g) values of related data units allows the data units comprising the highest values to be selected, in addition to the initial data units, into the selection data set that is to be synchronized. The metadata can be collected by applying a minimum spanning tree method or by means of content analysis, for example. To optimize the processing resources and the time required, deviations from the above calculation method can be made. For example, the number of paths to be taken into consideration can be restricted to only comprise direct links, in which case path length is one. Methods for restricting the number of the paths to be taken into account include Dijkstra's minimum path algorithm and Kruskal's algorithm.

FIG. 4 shows a method according to a preferred embodiment of the invention. Metadata comprising relevance and utility information are collected 401 into the system as described above. The metadata can be maintained in the memory MEM, SMEM in data structures, in the application executing the method, or in the application input data. Metadata can also be loaded from network databases, through the Internet, for example. To the metadata is added a new initial data unit that is to be synchronized, the related data units and utility and relevance values illustrating the relationships between them. According to a preferred embodiment, general rules are used, such as: the relevance value on a link from any electronic mail item to any related word processing file is always 0.7. Consequently, the value 0.7 is always used, irrespective of the electronic mail item or the word processing file, which reduces the space needed for storing the metadata.

In a preferred embodiment, the metadata is application-specific. In that case, new metadata needed for selecting data units for a new application are added for example to application-specific directories in the synchronizing device (TE, S). The metadata determines the relationships between electronic mail data items synchronized by an e-mail application, for example. In other words, the metadata from which the relationships between the data units are to be fetched are selected according to the application employed. Application-specific metadata can also be used for influencing the relationships between the data units of different applications by applying different relevance and/or utility values to the links between them. For example, a link from an electronic mail item to a word processing file has a higher relevance value than a link from a calendar entry to a word processing file. Application-specific metadata can also be used in a table format, for example, in which the relevance and/or utility values between different applications are given.

Application-specific metadata can be modified according to the purpose of use, and, in addition, different metadata can be used in different situations, i.e. for different synchronization contexts. For example, when a person is leaving for a business trip, the relevance of business card data units is higher than when s/he is leaving for a holiday trip. Metadata can be arranged for use in different synchronization contexts by applying different application- or device-level user profiles, similarly as user profiles arranged at mobile stations. Profile-specific metadata may be stored for the different profiles; it is also possible to modify the metadata or to select the data units to be synchronized on the basis of different criteria in different situations. Typical synchronization contexts include a general context, business trip, holiday trip, reading of electric mail messages and meetings. For example, when a meeting has been scheduled for the user (which can be stated from the calendar), data is synchronized with the user's terminal TE such that the business cards of those participating in the meeting form the initial data set and they are provided with links of high relevance values to the electronic mail messages last sent by the participants.

The user also has the possibility to influence the metadata, for example by adding new links between the data units, or to change the utility or relevance values of the links. To maintain good usability, a predetermined number of high-level user preferences can be defined, the metadata being automatically determined and modified according to the preferences. This could be illustrated by an example in which the user considers business cards not to be important and thus selects a low priority for them. The synchronization application may therefore set low relevance values for business cards. All preferences related to synchronization can be determined user-specifically, and the appropriate preferences can be selected using the user ID (the preferences can also be stored on an Integrated Circuit (IC) card, for example).

According to yet another embodiment of the invention, metadata can be collected and updated 401 by analyzing the contents of the data units. In response to changes in the data unit contents, the relevance and/or utility values of the contents can be changed as well.

Metadata updating 401 can be arranged to take place as an automatic monitoring of user actions. This means that a new data unit with its relevance data can be automatically added to the metadata when the user requests for the data unit in question. In addition, the frequency of use of the data units can be monitored and the relevance and/or utility values changed automatically on the basis of the monitoring. Relevance values can be changed on the basis of the frequency of use, and utility values on the basis of the duration of use, for example. The monitoring of user actions and automatic collection of metadata can be arranged by means of neural networks, for example.

When synchronization is needed, an initial data set is determined 402. The initial data set is preferably a pre-determined application-specific set. The user may also add data units to or remove them from the initial data set. Next, metadata associated with the initial data units of the initial data set are retrieved 403, i.e. the links from the initial data units are defined.

According to an embodiment of the invention, metadata can be modified 404 according to application or situation. An application- or situation-specific transform function can be used for weighting different data units differently to provide synchronization profiles such as those referred to above. The transform function refers particularly to application- or situation-specific coefficients for the relevance and utility values of the different data units. The transform function is applied to the links between the data units, and the transformed relevance and utility values are then used at later stages (405). This embodiment provides an advantage in that the data units can be weighted differently for different purposes and situations, but employing as small memory space as possible.

It is also possible to exclude 404 some of the data units indicated in the metadata already before the expected gained utility values are calculated. The exclusion may be based on a minimum value set for utility and/or relevance, in which case only related data units of the initial data set that exceed the minimum value qualify as candidates for the selection data set. When a minimum relevance value is applied, a high-relevance link or a short path can be preferred over long paths of low relevance. If relevance is assigned a high minimum value, the impact of high utility value can be reduced in the selection of data units. For example, a minimum value set for utility allows the synchronization of data units easily obtainable by other means (and thus providing low utility), such as telephone numbers, to be prevented. Another possible exclusion criterion is path length, which allows data units that are too far away from the initial data set to be excluded. In addition, the exclusion method in step 404 allows limit values to be set, whereby expected gained utility values of all data units included in the metadata do not need to be calculated and compared. This speeds up the selection process and reduces the processing capacity needed in the equipment implementing the method. The minimum values applied in the exclusion can also be application-specific, in which case they vary according to the purpose of use.

The metadata (and the modification and/or exclusion, if any, of step 404) provide related data units associated, one way or another, with the data units of the initial data set. The relevance and utility values denoted by the paths leading to the related data units are preferably used for calculating 405 expected gained utility values E(g) for them. The expected gained utility values obtained for the different data units are compared 406. The data unit with the highest expected gained utility value is added 407 to the selection data set. When a new data unit is added to the selection data set, the routine checks 408 whether an end criterion determined into the data system in advance is met. The end criterion may be, for example, exceeding the maximum size set for the data to be synchronized; exceeding the maximum number of data units; or the non-attainment of minimum expected gained utility value (i.e. there are no data units left which would exceed the minimum value of expected relevance). If the end criterion is not met, the routine proceeds by adding 407 a new data unit to the selection data set.

Once the end criterion is met, the selection data set, which typically comprises related data units defined according to the initial data set and the end criterion, is synchronized 409. In this connection, the changes made to the selection data set since the last synchronization event can be checked and the changed data units, or at least data about the changes, can be sent to the other party involved in the synchronization. It is to be noted that as a modification to the above description, only the relevance values can be used for selecting the data units (in the comparison 406 or as an end criterion 408). The data selection according to steps 401-408 described above can be carried out in one device participating in the synchronization, in some of the devices, or in all of them.

The selection data set can be synchronized using any synchronization method. The synchronization may be carried out using a protocol based on the SyncML standard, although the scope of application of the invention is not restricted thereto. According to the SyncML standard, a synchronization session is first initialized in step 409 to select the database to be synchronized. A SyncML client device (TE) comprises a Sync Client Agent executing the SyncML protocol. The client agent may send the SyncML server (S) a SyncML message (Client Modifications) containing information about the changes made to the selection data set since the last message was sent. The SyncML server comprises a Sync Server Agent, which controls the synchronization, and a Synchronization Engine, and it usually waits for the client's initiative for the synchronization. The SyncML server synchronizes the data, i.e. analyses the changes made to the selection data set and harmonizes the data units (makes the necessary additions, replacements and deletions). The SyncML server then sends the client device a Server Modifications message which comprises the information about the changes made to the selection data set since the last synchronization message from the server S. Although simple, the above example serves to illustrate synchronization based on the SyncML standard.

It is also possible to use a modified SyncML protocol, in which case the data to be synchronized can be selected during the initialization of the synchronization session. According to a preferred embodiment of the invention, it is also possible to define during the synchronization session whether the TE and the S support the adaptive synchronization of the preferred embodiment. In that case the TE uses the initialization message to request the adaptive synchronization type for use, the synchronization type being provided with a specific Alert code in the SyncML standard. If the S supports adaptive synchronization, the routine may proceed according to steps 402-408 described above to select the selection data sets in the synchronization client device TE and the synchronization server S. When the TE has determined the selection data set, it sends the modifications (Client Modifications) that have taken place since the last synchronization session to the synchronization server S. The TE may also send additional requirements relating to the determining of the selection data set, for example that a particular data unit must be included in the set, which the server S must take into account when selecting the selection data set. TE preferences and other data relating to adaptive synchronization may be transmitted in a Meta element and in an EMI field, for example. The S selects (402-408) its selection data set in a similar manner. The server S preferably carries out the selection such that at least the data unit modifications sent by the TE are taken into account. Alternatively, it is possible that the S informs the terminal TE about the selection data set it has selected prior to the synchronization. This, however, causes increased delay and adds to the amount of data to be transferred.

The S harmonizes the data units in the selection data set it has selected on the basis of the modifications sent by the TE and those made into the database (DB) synchronized by the server S. After the harmonization, the S sends the modifications (Server Modifications) that have taken place in the selection data set since the last synchronization session to the TE. On the basis of the modifications, the TE modifies the data units in its memory MEM. According to an embodiment, the TE may send information about the initial data set and other preferences, if any, during the initialization to the server S, which selects the selection data set on the basis of the metadata and the initial data set.

FIG. 5 shows a method according to a second preferred embodiment of the invention in which the metadata can be used also for excluding data units of the initial data set. Metadata, which can be updated in the above described manner and which comprises relevance and utility information, is collected 501 into the system. The relevance and utility values of the data units can be changed, even if the data units concerned were in the initial data set. When a need arises to carry out synchronization, an initial data set is determined 502. Next, at least metadata associated with the initial data units of the initial data set are retrieved 503, i.e. the links between the initial data units are defined.

The importance of the initial data units with regard to other initial data units is calculated 504. This can be achieved experimentally by removing one data unit at a time from the first data set and by determining, on the basis of the metadata, the expected gained utility value to be obtained if a data unit is added. The expected gained utility values calculated for each initial data unit are compared 505. The initial data unit with the highest expected gained utility value is added 506 to the selection data set. When a new initial data unit is added to the selection data set, the routine checks 507 whether the end criterion determined into the data system in advance is met. The end criterion may be for example the maximum size set for the data to be synchronized, the number of the initial data units, or the non-attainment of the minimum value set for the expected gained utility value. If the end criterion is not met, the routine proceeds by adding 506 the new initial data unit to the selection data set. When the end criterion is met, the initial data units in the selection data set can be synchronized 508. This allows the least relevant initial data units to be removed from the initial data set.

The embodiment of FIG. 5 provides an advantage in that it allows initial data units that have typically been determined in the initial data set on a relatively permanent basis to be placed into an order of relevance and only the most relevant initial data units to be synchronized. The functions shown in FIGS. 4 and 5 can also be combined, in which case the remaining initial data units are considered to provide the initial data set (step 402) and thus instead of entering step 508, the routine may proceed through step 403 to assess the relevance of the data units related to the initial data units.

The user's action can be monitored and the metadata updated 501 on the basis of the use of a data unit. For example, the terminal TE may be arranged to monitor the use of audio data files stored in the terminal. When an audio data file has been played, it can be marked for removal, added to the initial data set and replaced by a new audio data file in the next synchronization session. This can also be achieved by changing the relevance and/or utility value to indicate that it is relevant to synchronize an audio data file marked for removal by the audio application. Consequently, an embodiment is provided which allows to determine data units to be removed and to replace the data units during the next synchronization by a new data unit of a similar type.

It is also possible to apply the method such that data units remaining outside the selection data set after the end criterion has been met are automatically removed. For example, the relevance and utility values of an audio track of a specific music type can be modified according to user behaviour such that instead of being replaced by new ones, the audio tracks of the music type are removed. Similarly, outdated contact information or electronic mail messages can be deleted with this method.

Data amount can be used as an end criterion in steps 408 and 507. In that case the size of the selection data set is always checked after a new data unit has been added. When a predetermined size limit is reached, the synchronization of the selection data set may begin. According to a preferred embodiment, it is also possible to synchronize data units (or information relating to modifications made to them) one at a time, starting from the data unit that is the closest to the initial data unit. When the predetermined maximum size limit for the data to synchronized is reached, the synchronization is interrupted. The terminal TE may also send the synchronization server S a message when the maximum size limit is exceeded so that the S no longer sends data units for synchronization. In this embodiment, the selection data set is selected during the synchronization, unlike in FIGS. 4 and 5. The embodiment's advantages appear in cases where the size of the data units is not known, the calculation of the size of the data units requires a large processing capacity, or the server does not know the memory space available at the terminal.

According to a further embodiment, data unit size is also taken into account in the comparison (steps 406 and 505). The ratio of the expected gained utility value $E(g)$ (or the gained utility value g) to the data amount can be calculated for the data units. The data unit having the highest $E(g)$ per kilobyte is selected (407, 506) into the selection data set. This allows smaller data units to be preferred over larger ones. However, the comparison must be defined such that a small data unit of low relevance is not preferred over a large data unit of high relevance. This can be accomplished for example by applying a logarithm of data unit size, instead of size, in the comparison.

According to yet another embodiment, the user interface UI; SUI can also be used for inquiring the user about the need for synchronizing one or more data units (before step 409 or 508). This embodiment is useful when large data units are concerned and mainly when the synchronization is to be carried out with a terminal, which has a very limited storage capacity.

The above-described embodiments are typically applied at the synchronization server S, which selects the selection data set to be synchronized, and, thereby, has an effect on the amount of data to be sent to the terminal TE, which typically has relatively limited memory resources. The present method can also be used in the terminal TE for selecting a selection data set, the modifications made to the set being informed to the synchronization server S. Usually the number of data units added to the terminal TE by the user is fairly small, and thus all new data units (or other modifications made at the terminal TE) can be easily synchronized. However, if savings in time or in transfer costs are to be aimed at, the above solution can also be used to limit the amount of data to be transmitted from the terminal TE for synchronization.

In server-to-terminal synchronization, different values (relevance, utility) are preferably used in the metadata or in other criteria related to the selection of the data units than in terminal-to-server synchronization. At the server S side, the purpose may be to limit the required memory space (for the TE), whereas the aim at the terminal TE may be to save the processing resources needed for the comparison and selection of the data units. An embodiment of the solution of the invention provides various profiles (with different metadata or different exclusion/end criteria) for different transfer situations. Fast synchronization can be determined for expensive transfer links (through public mobile communications networks) to only synchronize particularly important data units. Full synchronization can be carried out in a local area network of a company, for example.

Figure 6:
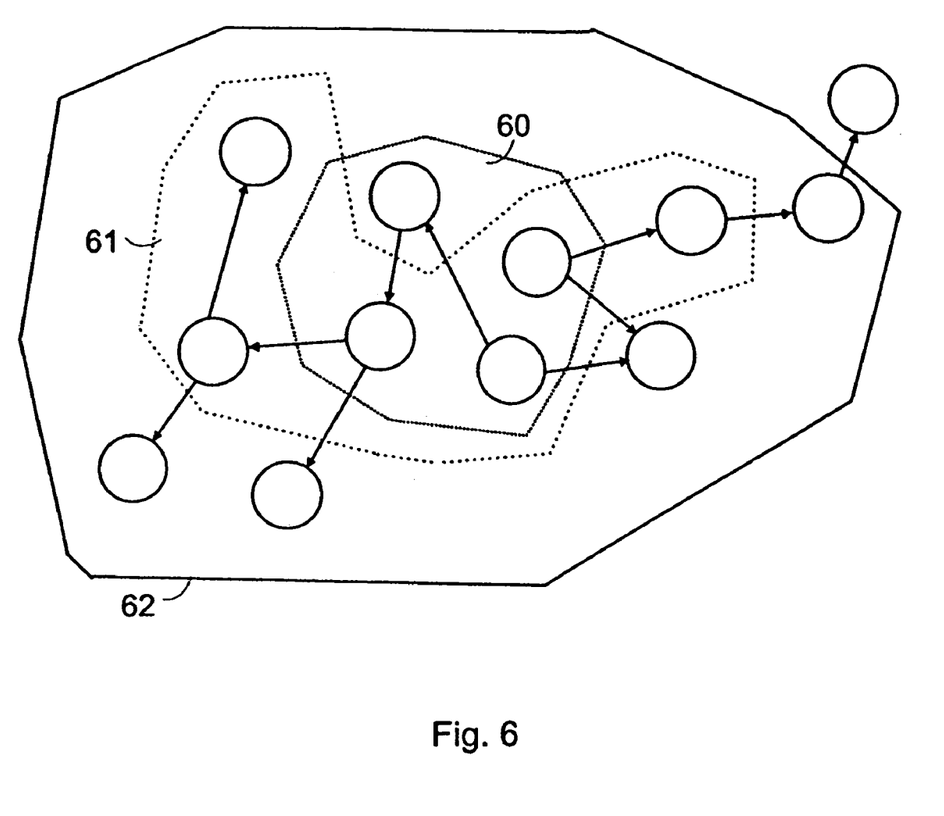
FIG. 6 shows an initial data set and adjacent data units associated with it.

FIG. 6 further illustrates the initial data set and the selection data set. The initial data set 60 defined with a dotted line comprises four data units with links that illustrate their relationships with other data units. The circles in FIG. 6 illustrate all data units which according to the metadata links are in some way associated with the initial data set 60. A dashed line 61 defines the selection data set to be synchronized, obtained by employing the method of the invention. As already described above, one data unit at a time is preferably added to the selection data set 61, the data units that are closest to the initial data units being typically the most important ones as well. It should be noted that the selection data set 61 does not comprise all the data units of the initial data set, i.e. the method illustrated in FIG. 5 has been used. FIG. 6 further shows a so-called pre-excluded set, defined with a continuous line 62. Expected gained utility values have been calculated for the data units in the set 62, which is selected using the exclusion of step 404. A data unit with a too low relevance value, for example, has been left outside the set 62.

According to an embodiment, a reference user data unit, which is always included in the initial data set and which has links to other data units, is added to the initial data set 60. The user data unit itself is not a subject of synchronization, but it defines the data units that are to be taken into account when the selection data set is selected.

It is apparent to a person skilled in the art that as technology advances, the basic idea of the invention can be implemented in various ways. The invention and its embodiments are therefore not restricted to the above-described examples but they may vary within the scope of the claims.

In the following some complementary and/or alternative features differing from the above illustrated embodiments are described. These features may be implemented in a synchronization device (TE; S).

In an embodiment the selection algorithm in synchronization device (TE; S) is arranged to maintain an initial set, a selection set and a candidate set of data items. As already mentioned, the initial (data) set contains the items known a priori to be needed and the selection set contains the currently selected items. The candidate set contains items which are currently candidates for selection. The candidate set me be equivalent to a set of neighbour items of the selection set.

Figure 7:
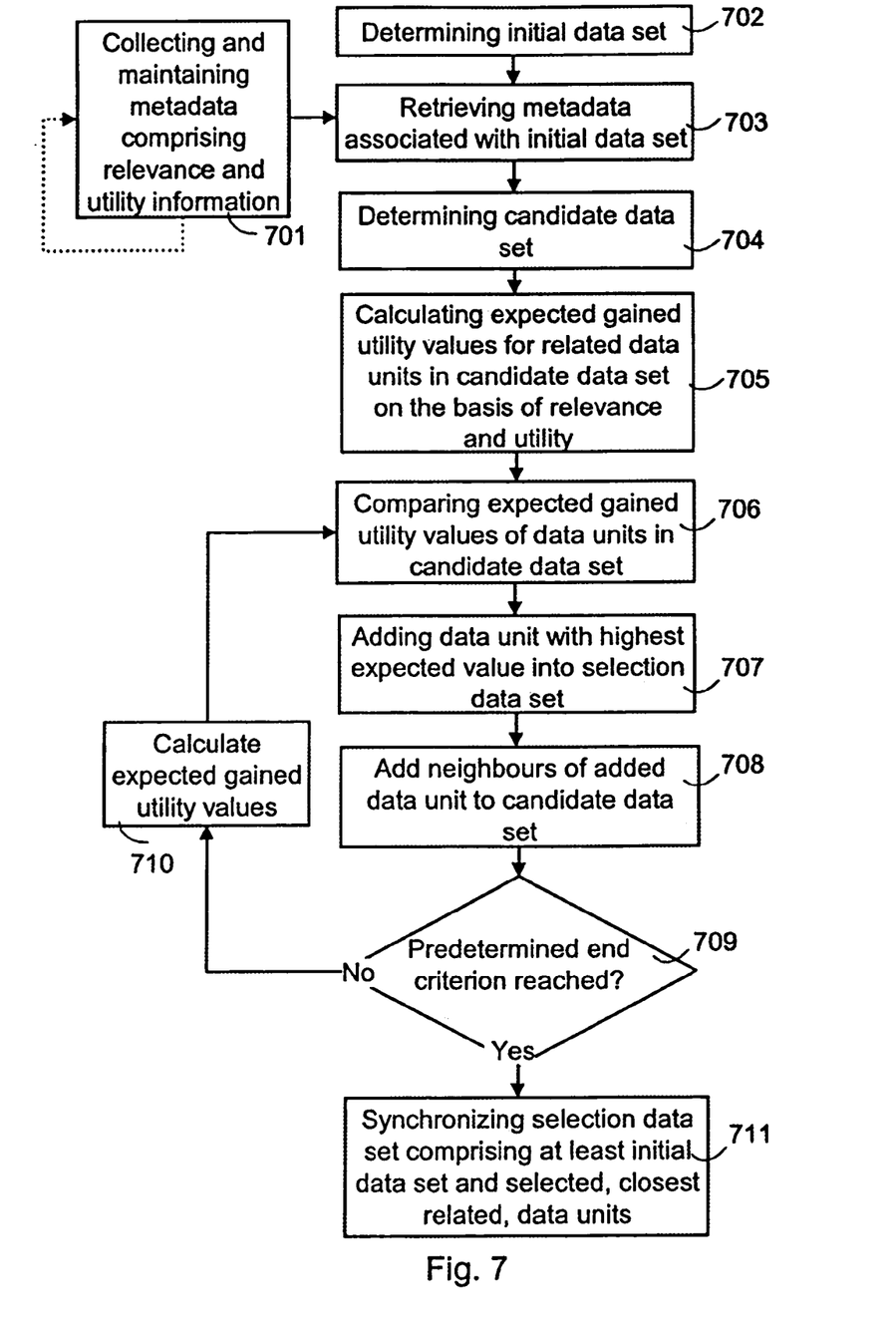
FIG. 7 is a flow diagram illustrating a method according to a third embodiment of the invention.

An embodiment of the modified algorithm is illustrated in FIG. 7. Steps 701-703 may be carried out as already illustrated in connection with steps 401-403 of FIG. 4, and there may be a further optional step such as the step 404 of FIG. 4 before step 704. In step 704 the candidate data set id defined. The selection set is initialized to be equal to the initial set, and the candidate data set is then initialized to contain all the neighbouring items of the selection set. In the present embodiment directly neighbouring data item are selected, i.e. data items only one link away from a data item in the selection data set. However, the data items may be selected by some other criterion to the candidate data set.

In step 705 expected gained utility values for data units in candidate data set are calculated. The best data item in the candidate set is added to the selection set (steps 706-707). Further, the method comprises a step 708 of updating the candidate set, wherein the neighbours of the data item recently added to the selection data set (if they are not candidates or selected) are added to the candidate set. Steps 709 and 711 may be carried out as already illustrated in connection with FIGS. 4 and 5. In each iteration in step 710 expected gained utility values for data items in the candidate data set and in the selection data set are calculated (due to the possible new candidate data items). It is to be noted that the relevance and/or utility information may be changed also in step 710. In one embodiment the relevance values of data items of data items in candidate set and selection set are updated in step 710 due to the changed candidate set, and expected gained utility values are recalculated on the basis of these new relevance values. The above illustrated embodiment enables to considerably reduce processing since not all paths need to be considered. In the following some more detailed features related to this embodiment are illustrated.

For each data item its relevance is maintained. The relevance of a data item is the combination of the relevances of all paths leading from the initial set to the data item. However, only paths within the selection set and the candidate set are considered, thus enabling to considerably reduce required calculations. The relevance of all items in the initial set may be set to be 1.0. The initial relevance of all other items may be set as zero.

For data item A added (in step 704 or 708) to the candidate set, all the links leasing from the candidate set to the item A are iterated (in step 705 or 710). For each link BA, going from an item B in the candidate set to the item Am the relevance of the new item A is modified as follows:

$$A.relevance = A.relevance + B.relevance*BA.relevance - A.relevance*B.relevance*BA.relevance.$$

The underlying principle is that the relevance of the item A is the probability of the item A being needed by the user, and the relevance of a link BA is the probability that the user will need the item A, given that he needs the item B. This, the total relevance of a path terminating in link BA is B.relevance*BA.relevance. However, there can be several paths leading to item A, so their relevances are added using the probability rule.

$$P(A \cup B) = P(A) + P(B) - P(A)*P(B).$$

In a new item A, added to the candidate set, contains links pointing to the selection set or the candidate set, these links represent new, previously unknown paths leasing to linked data items in the selection set or the candidate set. The relevances of the data items forming these links are updated (in step 705 and/or step 710) to take into account the new paths. This is done by recursively following links, starting from the links leading from A to the selection set or the candidate set, and updating relevances along the way.

In one embodiment, the handling of utility is also different that illustrated above. The utility is mainly a property of data items, but it may be used via relationship links, which can apply modifiers. The utility of a link may be defined as m * item utility + c, where m and c are link properties. It is to be noted that this definition is only an example and more complex modifiers are also possible.

In an embodiment, besides the initial set, the candidate set, and the selection set, also an optional reference set is utilized by the algorithm. The reference set contains items which themselves are not needed, but have relationships to items that are. An example of reference items are sent emails: the user typically does not actually need to see what he has sent, so the sent emails are not very relevant. However, the emails that are responses to the sent emails (i.e. there is a "net-in-thread" relationship from a sent email to them) are usually more relevant to the user than emails which were sent to him unrequited. Initial items are reference items are processed similarly, the main difference is that initial items are automatically selected for synchronization, whereas reference items do not enjoy that privilege (but can be selected normally).

In the following a more specific illustration of the approximating algorithm for calculating the expected utility values is given. This algorithm utilizes the above illustrated features related to updating of relevance values and usage of candidate data set in the selection process. Inputs to the algorithm are:

Initial set I.
Reference set R.
SizeLimit determining how large the combined size of selected items can maximally be.

The result of the algorithm is the (ordered) selection set S which contains all selected items in the order that they were selected.

Each data item x has the following properties:
x.paths: a list of (relevance, utility) pairs.
Initially x.paths={ }
x.size: The size of the item (considered a constant)
x.utility: This value is calculated by methods outside the algorithm (considered a constant).
x.relevance: The overall probability that the user will need this item. Initially zero.
x.prev: a list of nodes that precede this node (used for detecting cycles). Initially x.prev={x}
x.exputil: Expected utility of x.
  x.exputil is calculated on-demand as follows:
  x.exputil=0.0;
  negProb=1.0;
  sort x.paths according to decreasing utility;
  for each pair (r,u) in x.paths do {
  x.exputil=x.exputil+negProb*r*u;
  negProb=negProb*(1−r);
  if (negProb==0.0) {//Optimization, not obligatory
    break;
  }
}

The x.eputil value can be cached to make its use more efficient. The cache is then invalidated whenever the x.paths property is modified.

Each link a has the following properties:
a.relevance: The relevance of the link.
a.utility: The utility of the link. Usually calculated from the utility of the target item.
a.target: The target item of the link.
  Other variables:
TotalSize: combined size of items selected so far.
  Initially zero.
C: set of candidate nodes, initially empty.
BestItem: item chosen for selection.

The algorithm maintains for each item x its aggregate relevance x.relevance. This aggregate relevance is the probability that the item x will be chosen for any reason, in other words aggregates the relevance of all the paths leading to x. When a new path p (with relevance p.relevance) leading to x is found, then x.relevance is updated as follows:

$$x.relevance=x.relevance+p.relevance-x.relevance*p.relevance.$$

This simply applies the probability rule:

$$P(A \cup B)=P(A)+P(B)-P(A \cap B).$$

The algorithm maintains a candidate set, which contains all the neighbors to the currently selected set. As was illustrated in FIG. 7, on each iteration one item is chosen from the candidate set and included in the selection set. After selecting the item, all its links are now candidates for following, and an update process (step 7100) is needed. The links may lead to:

a) an item which is either in the initial set, or which belongs to the previous set of the original node. In this case update processing does not continue further with this item since there is no point in updating initial items as they already have a relevance of 1.0, and if the item is in the previous set a loop is formed.

b) an item which is already selected. In this case the item's relevance and paths list is updated. The update process is continued recursively, as a new path to the item has been found, and the relevances are updated.

c) an item which is a candidate: Relevance and paths list is updated.

d) an item which is not a candidate. The new data item is added to the candidate set and relevance and paths list is updated.

The algorithm is described with pseudocode below:
S={ };
order I according to decreasing utility;
for each item x in I {
  if (TotalSize+x.Size>SizeLimit) {return;
  }
  add (
1.0, x.utility) to x.paths;
  x.relevance=1.0;
  add x.Size to TotalSize;
  add x to S;
}
for each item x in I ∪ R {
for each link a that goes out from x {
  if (a.target is not in S) {
    add (a.relevance, a.utility) to a.target.paths;
    a.target.relevance=a.target.relevance+a.relevance−
a.target.relevance* a.relevance;
add x to a.target.prev;
if (x not in C) {add x to C;
}
}
}
}
while (C !={ } and TotalSize<SizeLimit) {sort C according to decreasing expected utility;
  BestItem=null;
  for each item x in C do {
    if (TotalSize+x.Size>SizeLimit) {continue;
    }
    BestItem=x;
    remove x from C;
    break;
  }
  if (BestItem==null) {return;
  }
  add BestItem to S;
  TotalSize=TotalSize+BestItem.size;
  UpdateRelevances (BestNode, BestNode.relevance);
//Function explained below
}

The algorithm uses the UpdateRelevance ( ) function, which is described with pseudocode below. The RELEVANCE LOW LIMIT is a minimum relevance value beyond which there is no point to update relevances, for instance 0.01. The variable LinkRelevance is used for simplifying calculations.

UpdateRelevances (item, relevance) {
  if (relevance<RELEVANCE LOW LIMIT) {return;
  }
  for each link a that goes out from item {
  if (a.target in I or a.target in item.prev) {continue;
  }
  LinkRelevance=relevance*a.relevance;
  Add (LinkRelevance, a.utility) to a.target.paths
a.target.relevance=a.target.relevance+LinkRelevance

```
a.target.relevance*LinkRelevance;
add item to a.target.prev
if (a.target in S) {
UpdateRelevances (a.target, LinkRelevance);
}else if (a.target not in C) {
add a.target to C;
}
}
}
}
```

In the following some exemplary uses cases are described, wherein at least some of the above illustrated features of adaptive synchronization may be applied.

In a first exemplary use case data items that should be synchronized are selected when preparing for an offline mode. For instance, a user is currently located at the office, bit will soon leave for a business trip. He needs to synchronize to his terminal information relevant to the customer meeting he will have during the trip. Due to the uncertainty of whether he can establish data connections from his destination country or not, he must make sure all needed data is locally available on his terminal. There is not sufficient space on the terminal for all the data that is currently relevant to the user in one context or another. Simply synchronizing all PIM (Personal Information Management) data and all documents available to the user if thus not possible. New PIM data is synchronized, notably including the meeting appointments for the near future. Since the appointments are needed, the synchronization algorithm determines that also for instance the following other items are needed: attachments of the appointments, contact information for participants, customer information for participants/participant companies that have such information in the corporate database, recent emails from/to participants (such as discussions that led to the meeting), emails not from/to participants but with same/similar subjects, attachments of these emails, and documents in the corporate intranet, document database or shared directories, pointed to from emails or appointments. Data type-specific rules may be used to determine the utility of an item. For example, a mail has higher utility (is more important) if a "important" flag is on, the sender is in the user's contacts list, the sender is the user's colleague/superior, the mail has been recently read by the user (note that mails not previously seen by the user should be included into the initial set), or re-read by the user, the mail is a reply to a recent mail sent by the user, or the user has previously promptly replied to mails sent by this user.

To help the system to handle special cases, there could also be an easily accessible "Favourites" list, where the user can add persons, email threads and keywords which merit special attention (an increase in the utility). This would thus be what is often called a "whitelist". A "blacklist" which lists persons, threads and keywords that signify low importance might also be used. A compromise solution could be a list where the user could optionally set the utility significance for each item separately (from options such as "unimportant", "important", "critical").

The system synchronizes items to the terminal in expected utility order, starting from the most important, and stops at the latest when it runs out of space on the terminal. At this point it has synchronized to the terminal all data somehow related to the appointments. Likely also all other emails have been synchronized, but attachments not related to the appointments in any way have been left out. For this use case, the system may be configured to: determine what data items are certainly going to be needed by the user, determine relationships between data items, determine relevance of the relationships, determine utility of the data items, calculate expected utility (overall importance) of data items, and synchronize items in expected utility (overall importance) order. Further, the system could enable whitelisting/blacklisting and users email threads or keywords.

In a second exemplary use case (Automatic Synchronization over Bluetooth), the terminal synchronizes by using Bluetooth (or some other local are network with limited coverage) without user intervention. The user may move out of range at any time, and battery usage should be minimized. Therefore synchronization should start with the most important items and refrain from synchronizing low-priority items when battery is low. For instance, the user has enabled automatic synchronization between his workstation and his mobile phone. With certain intervals, the phone will check if it is in Bluetooth range of the workstation, and if this is the case and sufficient time has elapsed since the last synchronization, the phone will synchronize with the workstation. If synchronization is done in item importance order by utilizing the adaptive synchronization, the likelihood is lessened that an interrupted synchronization will result in the user not having important data available. Similarly, by not synchronizing less important items when the battery power is low, the power consumption of automatic synchronization can be reduced while minimizing the adverse effect perceived the user. For this use case, the system may be configured to: automatically synchronize with workstation at appropriate intervals, synchronize items in expected utility (overall importance) order, tolerate sudden disconnections without need to later repeat synchronization for the items already handled, and synchronize only important items when battery power is low.

In a third exemplary use case (Content Adaptation in Adaptive Synchronization), if there are several versions available of a data item (either created earlier or dynamically generated on-demand), synchronization is arranged such that a version most appropriate is selected. The limitations of the device and the functionality provided by the different versions may be taken into account. For instance, media files such as images or movies could be available in different size/quality combinations. Sometimes a different format may be required because the receiving device does not support the original format. Alternative versions share same relationship links. When the adaptive synchronization algorithm calculates the expected utility for a data item that has multiple versions available, it uses the best available alternative (best utility, possible taking size into account) and ignores the rest. The system should be configured such that when several alternatives for a data item are available, synchronization selects at most one of them. If one alternative is selected, it needs to be the one with the best utility. The item selection algorithm should behave as if instead of all the alternative data items, there was only one, the one with the best utility. The utility of a data item version should take into account how usable it is on the device: If one version offers more functionality that another, it should have greater utility. Specifically, if one version is editable and another is not, the editable version should have greater utility unless it is known with a high likelihood that editing will not be needed. If the device cannot handle the data format, utility should be zero.

In a fourth exemplary use case (Context-aware Synchronization) the algorithm takes context information (for instance bandwith and expected connectivity) into account when selecting data items to be synchronized. Some examples of context-sensitive synchronization behavior are illustrated in the following in the following. When the user is expected to still have narrowband access to data after synchronization session), small data items have a low priority during the synchronization session, as they can be synchronized on-demand later using the narrowband connection. Instead, synchronization should concentrate on getting large items synchronized while high bandwidth is available. On the other hand, if the user is expected to be totally offline after synchronization, synchronization cannot ignore the smaller elements. If the user is in using high-bandwidth, synchronization should be as complete as possible given the storage constraints of the device. If, on the other hand, only low bandwith is available, synchronization should only do the important items and leave the rest to wait until higher bandwidth is available. Similarly, if battery power is low, only important items should be synchronized. If the user is in a hurry, synchronization should start to work in the determined importance (expected utility) order, but at the same time offer the user a list of the larger items to allow him to manually select/deselect them for synchronization. For this use case, the system may be configured to determine context-sensitive utility and/or relevance for data items. It is possible to apply context-sensitive importance (expected utility) threshold for synchronization. Further, the user may be provided with a list of items-to-be-synchronized while synchronizing in the background, from which the user can select (for priorization) or remove items. The list should be filtered so that it is not of unmanageable length.

In a fifth exemplary use case (Personalized Synchronization) the selection algorithm takes user behavior patters into account. The relevance of relationships, as well as the utility of data items can differ from person to person. For instance, one user may rarely call anyone, and considers contact items unimportant, whereas another calls people frequently and requires the information to be available. The system can keep track of which items the user accesses and when, and use that information to adapt to user behavior. The metadata updating on the basis of user actions was already illustrated above. An end-user application (for instance an email client) may be modified to track user behavior. Another possibility is to apply server-side tracking. For example, it is possible to track how quickly the user responds to emails and to try to correlate that against sender name, importance flag, list of other receivers, and other similar information to build a model of what is important to the user. For this use case, the system may be configured to perform at least some of the following features: the user is able to control the general default parameters of adaptive synchronization using high-level configuration options, the user is able to create simple importance/relevance rules that target specific data items, context-sensitivity requirements are applicable also with user identity as a part of the context, the system collects access frequency and duration information which items are synchronized manually, and the system updates relationship relevance and utility of items based on observed user behavior.

In a sixth exemplary use case data items that are of low importance are automatically removed. This possibility was already illustrated above. In order to keep the user from being unpleasantly surprised, a confirmation for the removal may be requested from the user (at least for some data items) . The user may be further able to "lock" items so that they are not automatically removed. Items on the user terminal (TE) that are not selected by the synchronization algorithm, may be synchronized back to the network (if necessary) and removed from the terminal. The system may be configured to set the removal policy for each item separately, based on the information it has about the item (for instance importance, usage pattern).

In a seventh exemplary use case (Augmenting a Limited Update) the system ensures that related items are up-to-date and available on the terminal, when the user requests an update for specific items using a cellular connection. Occasionally a user will require certain items to be synchronized on-demand. For example, a secretary might have added a new meeting to his calendar, or an attachment document may be missing. In this case the user would request the synchronization of a specific type of items (appointments), or even a specific item (a specific attachment document). To reduce the likelihood that yet another synchronization will be needed as the user discovers that there were actually still more items he needed, the system should determine which data items are related to the required item(s), and either automatically synchronize those also, or at least offer the list to the user as a suggestion of items that might also need to be synchronized.

In an eighth exemplary use case (Prefetch for Associative Data Management) same mechanisms that are used in adaptive synchronization to select the most important related items may be used in an associative data management system for pre-fetching information. An example of such data management system is the TaskMonkey system from Silicongo. The system may be configured to fetch the most important related data items automatically when the user requests a certain data item. Further, the system may be configured to determine relationship relevance and item utility values from observed browsing patterns.

In a ninth exemplary use case (Synchronizing with USB Memory Dongles) the system provides support for users carrying their data on USB memory dongles (or some other similar portable memory units). This use case is simply a special case of previous use cases that involved synchronizing with a telecommunications terminal device: now the data may be synchronized to the USB dongle. The adaptive synchronization can help also in this use case by assisting the user with selecting relevant files to be synchronized to the USB dongle, either by offering suggestions (such as a list of important files that are not yet selected for synchronization) or by autonomously selecting files in addition to those the user has selected manually. The manually selected documents would then make up the initial set for adaptive synchronization. For example, if the user has manually selected a project plan, the system could autonomously also select other project documentation that the user has recently accessed.

What is claimed is:

1. A method for selecting a data set to be synchronized from databases of a data system, the method comprising:

maintaining in the data system, metadata representing relationships between data units for the purpose of selecting the data set to be synchronized, the metadata comprising at least information on relevance of the data units with regard to one another, wherein the relevance includes a probability value that a data unit associated with an initial data unit will be needed;

retrieving metadata associated with at least one initial data unit of a first data set in response to a need to synchronize the first data set;

selecting a second data set for synchronization, the second data set comprising at least one data unit which, on the basis of the retrieved metadata, is most relevant to the initial data unit.

2. A method according to claim 1, further comprising:

selecting one data unit at a time into the second data set in an order of relevance;

checking a size of the second data set after a new data unit has been added; and initiating synchronization with the second data set in response to a predetermined size limit having been reached.

3. A method according to claim 1, wherein only data units which exceed one or more predetermined exclusion criteria are selected into the second data set.

4. A method according to claim 1, wherein the retrieved metadata further includes utility information representing utility provided by at least one data unit associated with an initial data unit in the retrieved metadata, either directly or through other data units, provided that the initial data unit has been selected.

5. A method according to claim 4, further comprising:
determining numerical values representing relevance probabilities and utilities between the initial data units and other data units for the maintained metadata;
forming links between the data units in the maintained metadata, the links being associated with the numerical values of at least relevance probability and utility;
multiplying relevance values of the links along at least one path originating from the initial data unit and leading to other data units;
selecting the utility value of a last link leading to another separate data unit to be used as the utility of that data unit;
calculating an expected gained utility value for each one of the other data units by multiplying the utility value by the relevance value;
comparing the expected gained utility values of different data units; and
selecting at least one data unit with a highest expected gained utility value into the second data set.

6. A method according to claim 1, further comprising:
updating the maintained metadata on the basis of user actions.

7. A method according to claim 1, wherein
application-specific metadata are added to the data system in response to adoption of a new application; and
the metadata associated with the at least one initial data unit are retrieved as required by the application.

8. A method according to claim 1, wherein
situation-specific metadata for at least two different synchronization situations are determined into the data system; and
the metadata associated with the at least one data unit are selected as required by a synchronization situation.

9. A method according to claim 1, further comprising:
determining an expected gained utility value for initial data units in the first data set by experimentally adding initial data units, one by one, to the first data set; and
selecting into the second data set one or more of the initial data units the adding of which provides a highest expected gained utility value.

10. A method according to claim 1, wherein
the data system includes at least one synchronization client device and synchronization server;
a request for selecting a data set in accordance with the method is sent from the synchronization client device to the synchronization server during an initialization of a synchronization session;
second data sets are selected in the synchronization client device and the synchronization server in accordance with the method;
modifications that have taken place in the second data set since a last synchronization session are sent from the synchronization client device to the at least one synchronization server; at least one
the modifications that have taken place in the second data set since the last synchronization session are sent from the at least one synchronization server to the at least one synchronization client device.

11. A method according to claim 1, wherein a third data set is defined comprising one or more data items which are closely related to a data item currently selected into the second data set, and
new data items are selected to the second data set amongst the data items in the third data set.

12. A method according to claim 1, wherein the third data set and relevance information of data items are updated after selection of a data item from the third data set to the second data set, wherein the relevance of a data item is combination of relevances of all paths leading from the first data set to the data item.

13. A synchronization system comprising:
means for synchronizing data of at least two databases;
means for maintaining metadata representing relationships between data units, the metadata comprising at least information on a relevance of the data units with regard to one another and wherein the relevance includes a probability value that a data unit associated with an initial data unit will be needed;
means for retrieving the metadata associated with at least one initial data unit of a first data set in response to a need to synchronize the first data set;
means for selecting a second data set for synchronization, the second data set comprising at least one data unit which, on the basis of the retrieved metadata, is most relevant to the at least one initial data unit.

14. A synchronization system according to claim 13, further comprising:
means for selecting one data unit at a time into the second data set in the order of relevance;
means for checking a size of the second data set after a new data unit has been added; and
means for initiating synchronization with the second data set in response to a predetermined size having been reached.

15. A synchronization system according to claim 13, wherein
the retrieved metadata also contains utility information representing utility provided by at least one data unit associated with an initial data unit in the retrieved metadata, either directly or through other data units, provided that the initial data unit has been selected.

16. A synchronization system according to claim 13, further comprising:
means for taking application-specific metadata in use in response to adoption of a new application; and
means for retrieving the metadata associated with at least one initial data unit as required by the new application.

17. A synchronization device comprising:
means for sending modifications made to a data set to be synchronized of at least one database to at least one second party involved in the synchronization;
means for storing metadata representing relationships between data units, the metadata comprising at least information on relevance of the data units with regard to one another and wherein the relevance includes a probability value that a data unit associated with an initial data unit will be needed;
means for retrieving metadata associated with at least one initial data unit of a first data set in response to a need to synchronize the first data set; and
means for selecting a second data set for synchronization, the second data set comprising at least one data unit which, on the basis of the retrieved metadata, is most relevant to the initial data unit.

18. A synchronization device according to claim 17, wherein the retrieved metadata also contains utility information representing utility provided by the at least one data unit associated with an initial data unit in the retrieved metadata, either directly or through other data units, provided that the initial data unit has been selected.

19. A synchronization device according to claim 17, wherein the synchronization device is configured to define a third data set comprising one or more data items which are closely related to data items currently selected into the second data set, and the synchronization device is configured to select new data items to the second data set amongst the data items in the third data set.

20. A synchronization device according to claim 19, wherein the synchronization device is configured to update the third data set and relevance information of data items after selection of a data item from the third data set to the second data set, wherein the relevance of a data item is combination of relevances of all paths leading from the first data set to the data item.

21. A computer software product stored in a memory for controlling a synchronization device, comprising program code which, when executed in the synchronization device, causes the synchronization device to:

store metadata representing relationships between data units for selection of a data set to be synchronized, the metadata comprising at least information on relevance of the data units with regard to one another and wherein the relevance includes a probability value that a data unit associated with an initial data unit will be needed;

retrieve metadata associated with at least one initial data unit of a first data set in response to a need to synchronize the first data set;

select a second data set for synchronization, the second data set comprising at least one data unit which, on the basis of the retrieved metadata, is most relevant to the initial data unit.

22. A computer software product according to claim 21, wherein the retrieved metadata also comprises utility information representing utility provided by the at least one data unit associated with an initial data unit in the retrieved metadata, either directly or through other data units, provided that the initial data unit has been selected.

* * * * *